United States Patent
Goto

(10) Patent No.: US 12,532,161 B2
(45) Date of Patent: Jan. 20, 2026

(54) COMMUNICATION APPARATUS, COMMUNICATION METHOD, AND STORAGE MEDIUM

(71) Applicant: CANON KABUSHIKI KAISHA, Tokyo (JP)

(72) Inventor: Fumihide Goto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 180 days.

(21) Appl. No.: 18/059,884

(22) Filed: Nov. 29, 2022

(65) Prior Publication Data

US 2023/0087387 A1    Mar. 23, 2023

Related U.S. Application Data

(63) Continuation of application No. PCT/JP2021/020207, filed on May 27, 2021.

(30) Foreign Application Priority Data

Jun. 3, 2020    (JP) ................................. 2020-096833

(51) Int. Cl.
   *H04W 12/033*    (2021.01)
   *H04L 9/40*    (2022.01)
   (Continued)

(52) U.S. Cl.
   CPC ......... *H04W 12/033* (2021.01); *H04L 63/061* (2013.01); *H04W 76/10* (2018.02); *H04W 84/12* (2013.01)

(58) Field of Classification Search
   CPC ... H04W 12/033; H04W 76/10; H04W 84/12; H04L 63/061
   See application file for complete search history.

(56) References Cited

U.S. PATENT DOCUMENTS

2014/0355763 A1*  12/2014  Lee ..................... H04W 12/50
                                                380/282
2015/0026453 A1*   1/2015  Liu ........................ H04L 63/08
                                                713/151
(Continued)

FOREIGN PATENT DOCUMENTS

JP    2007028590 A    2/2007
JP    2012531817 A   12/2012
(Continued)

OTHER PUBLICATIONS

Po-Kai Huang, et al., Multi-link Security Consideration, IEEE 802.11-19/1822r9, May 11, 2020.
(Continued)

*Primary Examiner* — Tod R Swann
*Assistant Examiner* — Daniel Elahian
(74) *Attorney, Agent, or Firm* — Canon U.S.A., Inc. IP Division

(57) ABSTRACT

A communication apparatus capable of performing multilink communication conforming to the IEEE802.11 standard series, the communication apparatus includes an establishment unit configured to establish a link with another communication apparatus, and a first sharing unit configured to share, in a case where the establishment unit establishes a first link and a second link between the communication apparatus and the another communication apparatus, a PTK (Pairwise Transient Key) for encryption of unicast communication by 4 Way Handshake processing that is performed with the another communication apparatus in the first link, wherein, in the second link, the PTK is used to encrypt unicast communication in the second link without performing the 4 Way Handshake processing.

11 Claims, 9 Drawing Sheets

(51) Int. Cl.
*H04W 76/10* (2018.01)
*H04W 84/12* (2009.01)

(56) References Cited

U.S. PATENT DOCUMENTS

| | | | |
|---|---|---|---|
| 2016/0142915 A1 | 5/2016 | Choyi | |
| 2019/0364424 A1* | 11/2019 | Vanderveen | H04W 12/041 |
| 2020/0145391 A1* | 5/2020 | Sasidharan | H04L 9/0819 |
| 2021/0076437 A1* | 3/2021 | Kneckt | H04W 12/0471 |
| 2021/0114616 A1* | 4/2021 | Altman | H04W 76/15 |
| 2021/0329698 A1* | 10/2021 | Jang | H04W 80/02 |
| 2023/0119202 A1* | 4/2023 | Kishida | H04L 1/1607 370/328 |

FOREIGN PATENT DOCUMENTS

| | | |
|---|---|---|
| JP | 2018050133 A | 3/2018 |
| JP | 2019195207 A | 11/2019 |
| WO | 2019003375 A1 | 1/2019 |

OTHER PUBLICATIONS

Po-Kai Huang, et al., Multi-link Setup Follow Up II, IEEE 802.11-20/0387r0, Mar. 9, 2020.
Huizhao Wang, et al. Multi-Link Security and Aggregation Operations, IEEE 802.11-19/1963r1, Oct. 10, 2019.
Po-Kai Huang, Multi-link Security Consideration, Nov. 5, 2019, Doc. IEEE 802.11-19/1822r8.

\* cited by examiner

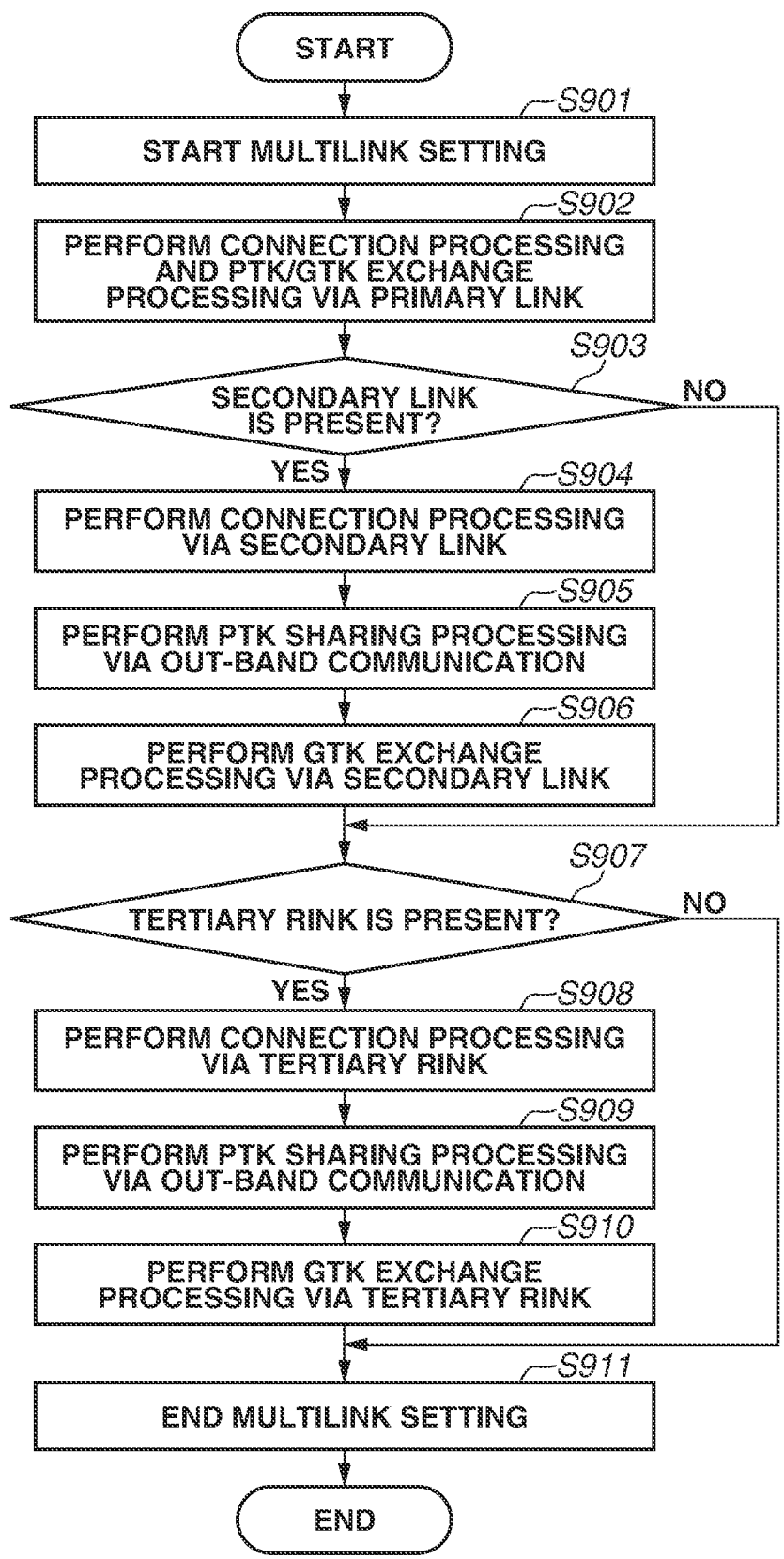

COMMUNICATION APPARATUS, COMMUNICATION METHOD, AND STORAGE MEDIUM

CROSS-REFERENCE TO RELATED APPLICATIONS

This application is a Continuation of International Patent Application No. PCT/JP2021/020207, filed May 27, 2021, which claims the benefit of Japanese Patent Application No. 2020-096833, filed Jun. 3, 2020, both of which are hereby incorporated by reference herein in their entirety.

BACKGROUND OF THE INVENTION

Field of the Invention

The present invention relates to a communication apparatus for wireless communication, a wireless communication method, and a storage medium.

Background Art

The IEEE802.11 series is known as a Wide Local Area Network (WLAN) communication standard developed by the Institute of Electrical and Electronic Engineers (IEEE). WLAN is an abbreviation for Wireless Local Area Network. The IEEE802.11 series standard includes the IEEE802.11a/b/g/n/ac/ax standards.

Patent Document 1 discloses execution of wireless communication using, in a case of communication conforming to the IEEE802.11ax standard, Orthogonal Frequency Division Multiple Access (OFDMA). The IEEE802.11ax standard achieves a high peak throughput by execution of wireless communication using OFDMA.

The IEEE has been studying the development of the IEEE802.11be standard as a new standard of the IEEE802.11 series to further improve the throughput and the frequency use efficiency. In the IEEE802.11be standard, a technique for establishment of a connection by an Access Point (AP) with a Station (STA) via a plurality of different frequency channels has being studied to achieve wireless communication at higher speeds.

CITATION LIST

Patent Literature
PTL 1: Japanese Patent Laid-Open No. 2018-50133

In the conventional communication via one frequency channel, communication is encrypted using a Pairwise Transient Key (PTK) serving as an encryption key for encrypting unicast transmission and a Group Transient Key (GTK) serving as an encryption key for encrypting broadcast transmission or multicast communication. PTK is an abbreviation for Pairwise Transient Key, and GTK is an abbreviation for Group Transient Key.

When communication is performed via a plurality of frequency channels, for example, a PTK and a GTK are generated and shared via a first frequency channel, and then a connection is established between communication apparatuses via a second frequency channel. However, there is no prescription on a method for exchange of encryption keys upon establishment of a connection. Consequently, there may arise an issue that an exchange of encryption keys cannot be performed with the communication apparatus with which a connection has been established via the second frequency channel.

SUMMARY OF THE INVENTION

The present invention is directed to providing an encryption key exchange method of a case where the number of frequency channels of established connections changes when communication is performed via a plurality of frequency channels.

To achieve the above-described object, a communication apparatus capable of performing multilink communication conforming to the IEEE802.11 standard series, the communication apparatus includes an establishment unit configured to establish a link with another communication apparatus, and a first sharing unit configured to share, in a case where the establishment unit establishes a first link and a second link between the communication apparatus and the another communication apparatus, a PTK (Pairwise Transient Key) for encryption of unicast communication by 4 Way Handshake processing that is performed with the another communication apparatus in the first link, wherein, in the second link, the PTK is used to encrypt unicast communication in the second link without performing the 4 Way Handshake processing.

Further features of the present invention will become apparent from the following description of exemplary embodiments with reference to the attached drawings.

BRIEF DESCRIPTION OF THE DRAWINGS

FIG. 1 is a diagram illustrating a configuration of a network to which a communication apparatus 102 belongs to.

FIG. 9 is a flowchart illustrating processing performed by the communication apparatus 102 according to the present exemplary embodiment.

DESCRIPTION OF THE EMBODIMENTS

Exemplary embodiments of the present invention will be described in detail below with reference to the accompanying drawings. Configurations according to the following exemplary embodiments are to be considered as illustrative, and the present invention is not limited to illustrated configurations.

Figure 1:
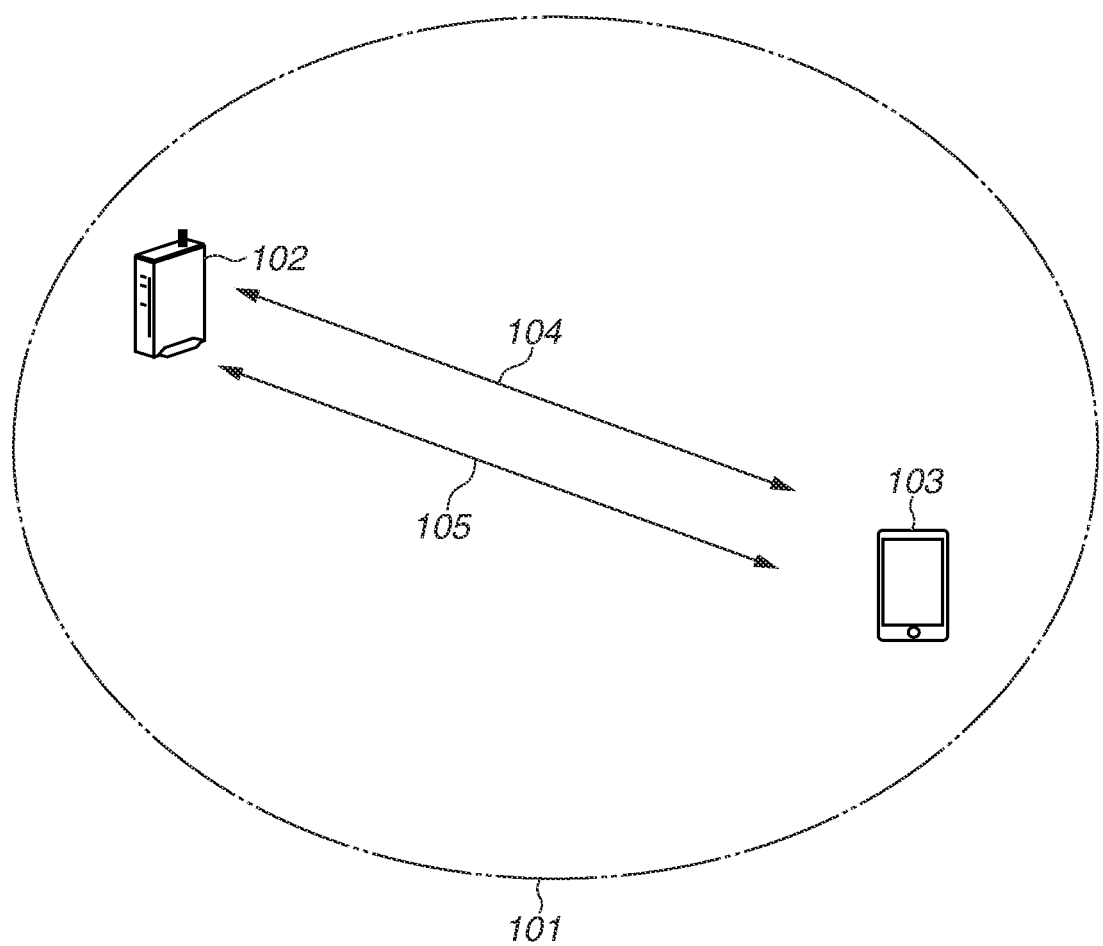

FIG. 1 illustrates a configuration of a network established by a communication apparatus 102 according to the present exemplary embodiment. The communication apparatus 102 is an Access Point (AP) having a role of establishing a network 101. The network 101 is a wireless network. According to the present exemplary embodiment, when the communication apparatus 102 establishes a plurality of networks, all of the networks have the same Basic Service Set Identifier (BSSID). BSSID is an abbreviation for Basic Service Set Identifier as a network identifier. The communication apparatus 102 shares the same Service Set Identifier (SSID) to all of the networks. SSID is an abbreviation for Service Set Identifier that is used as an AP identifier. The present exemplary embodiment uses one SSID even in a case where the communication apparatus 102 establishes a plurality of connections.

A communication apparatus 103 is a Station (STA) having a role of participating in the network 101. Each communication apparatus supporting the Institute of Electrical and Electronics Engineers (IEEE) 802.11be standard can perform wireless communication conforming to the IEEE802.11be standard via the network 101. IEEE is an abbreviation for Institute of Electrical and Electronics Engineers. Each communication apparatus can perform communication in the 2.4 GHz, 5 GHz, and 6 GHz frequency bands. The frequency bands that are used by each communication apparatus are not limited to the above-described frequency bands. For example, different frequency bands, such as the 60 GHz band, can also be used by a communication apparatus. Each communication apparatus can perform communication by using the 20 MHz, 40 MHz, 80 MHz, 160 MHz, and 320 MHz frequency bands.

The communication apparatuses 102 and 103 perform Orthogonal Frequency Division Multiple Access (OFDMA) communication conforming to the IEEE802.11be standard to implement Multi User (MU) communication that multiplexes signals of a plurality of users. OFDMA is an abbreviation for Orthogonal Frequency Division Multiple Access. In OFDMA communication, divided frequency bands called Resource Unit (RU) are each assigned to a different STA in a manner not overlapping with each other, and carriers assigned to respective STAs are orthogonal to each other. Thus, the AP can communicate with a plurality of STAs in parallel.

The communication apparatuses 102 and 103 establish a link via a plurality of frequency channels and perform multilink communication. The frequency channels are frequency channels defined in the IEEE802.11 series standard and refers to frequency channels that can perform wireless communication conforming to the IEEE802.11 series standard. In the IEEE802.11 series standard, a plurality of frequency channels is defined in each of the 2.4 GHz, 5 GHz, and 6 GHz frequency bands. In the IEEE802.11 series standard, the bandwidth for each frequency channel is defined as 20 MHz. A bandwidth of 40 MHz or higher created by channel bonding of adjacent frequency channels may be used in a frequency channel. Channel bonding enables the communication apparatuses 102 and 103 to communicate with each other by using the 40 MHz, 80 MHz, 160 MHz, and 320 MHz bandwidths. For example, the communication apparatuses 102 and 103 can establish a first link 104 via a first frequency channel in the 2.4 GHz band and a second link 105 via a second frequency channel in the 5 GHz band to communicate with each other via both of the links. In this case, the communication apparatus 102 maintains the second link 105 via the second frequency channel in parallel with the first link 104 via the first frequency channel. The communication apparatus 102 establishes links via a plurality of frequency channels with communication apparatus 103 in this way, whereby the throughput in communication with the communication apparatus 103 can be improved. The communication apparatuses 102 and 103 may establish a plurality of links in different frequency bands in multilink communication. For example, the communication apparatuses 102 and 103 may establish the first link 104 in the 2.4 GHz band, the second link 105 in the 5 GHz band, and a third link in the 6 GHz band. Alternatively, the communication apparatuses 102 and 103 may establish links via a plurality of different channels included in the same frequency band. For example, the communication apparatuses 102 and 103 may establish the first link 104 via channel 1 in the 2.4 GHz band and the second link 105 via channel 5 in the 2.4 GHz band. Different links in the same frequency band and in different frequency bands can also be established. For example, the communication apparatuses 102 and 103 may establish the third link via channel 36 in the 5 GHz band in addition to the first link 104 via channel 1 in the 2.4 GHz band and the second link 105 via channel 5 in the 2.4 GHz band. Establishment of a plurality of connections in different frequency bands with the communication apparatus 103 in this way allows the communication apparatus 102 to communicate, when a certain band is in congestion, with the communication apparatus 103 in other bands, which prevents degradation in the throughput in communication with the communication apparatus 103.

In multilink communication, a plurality of links established between the communication apparatuses 102 and 103 need to be at least different in frequency channels. In multilink communication, the interval between frequency channels of a plurality of links established by the communication apparatuses 102 and 103 needs to be larger than at least 20 MHz. While, in the present exemplary embodiment, the communication apparatuses 102 and 103 establish the first link 104 and the second link 105, the two communication apparatuses may establish three or more links.

In multilink communication, the communication apparatuses 102 and 103 can divide one piece of data into several pieces and transmit these pieces of data to the partner apparatus via a plurality of links. Alternatively, the communication apparatuses 102 and 103 may transmit the same data via each of a plurality of links to use communication via one link as a backup communication for communication via other links. More specifically, the communication apparatus 102 transmits the same data to the communication apparatus 103 by using the first link via the first frequency channel and by using the second link via the second frequency channel. In this case, even in a case where an error occurs in communication via the first link, for example, the communication apparatus 103 can receive data transmitted from the communication apparatus 102 since the communication apparatus 102 transmits the same data to the communication apparatus 103 via the second link. Alternatively, the communication apparatuses 102 and 103 may use different links according to the type of frame and the type of data to be communicated. For example, the communication apparatuses 102 and 103 may transmit a management frame via the first link and a data frame containing data via the second link. More specifically, the management frame refers to a Beacon frame, a Probe Request frame, a Probe Response frame, an Association Request frame, and an Association Response frame. In addition to these frames, a Disassociation frame, an Authentication frame, a De-Authentication frame, and an Action frame are also referred to as the management frame. The Beacon frame is a frame to announce network information. The Probe Request frame is a frame to request network information. The Probe Response frame is a frame to provide network information as a response to the Probe Request frame. The Association Request frame is a frame to request a connection. The Association Response frame is a frame to indicate a connection permission or an error as a response to the Association Request frame. The Disassociation frame is a frame to disconnect a connection. The Authentication frame is a frame to authenticate a partner apparatus. The De-Authentication frame is a frame to cancel the authentication of the partner apparatus and disconnect a connection. The Action frame is a frame to perform an additional function other than the above-described frames. The communication apparatuses 102 and 103 transmit and receive management frames conforming to the IEEE802.11 series standard. Alternatively, when the communication apparatus 102 transmits data related to a captured image, for example, the communication apparatus 102 may transmit meta information such as the date, imaging parameters (diaphragm stop and shutter speed), and positional information via the first link, and transmit pixel information via the second link.

The communication apparatuses 102 and 103 may be able to perform Multiple-Input Multiple-Output (MIMO) communication. In this case, the communication apparatuses 102 and 103 have a plurality of antennas, and one communication apparatus transmits different signals from these antennas by using the same frequency channel. The reception side receives at the same time all of the signals from a plurality of streams by using a plurality of antennas, separates the signals in each stream, and decodes the signals. Thus, the communication apparatuses 102 and 103 can communicate more data in the same time period by performing MIMO communication than in a case where MIMO communication is not performed. When performing multilink communication, the communication apparatuses 102 and 103 may perform MIMO communication via some links.

The communication apparatuses 102 and 103 manage operation parameters for wireless communication, such as the number of spatial streams and the communication bandwidth when performing MIMO communication via each link. Although these operation parameters are determined when a connection is established, the operational parameters can be changed after the connection. For example, there can be a case where the operational parameters of a communication bandwidth are restricted because of the congestion of neighboring channels. In a case where an operational parameter is to be changed, it is necessary to immediately notify the partner apparatus of the change.

While the communication apparatuses 102 and 103 conform to the IEEE802.11be standard, these apparatuses may conform to at least either one of legacy standards earlier than the IEEE802.11be standard in addition to the IEEE802.11be standard. The legacy standards include the IEEE802.11a/b/g/n/ac/ax standards. According to the present exemplary embodiment, at least either one of the IEEE802.11a/b/g/n/ac/ax/be standards and succeeding standards is referred to as the IEEE802.11 series standard.

While specific examples of the communication apparatus 102 include a wireless Local Area Network (LAN) router and a personal computer (PC), the present invention is not limited thereto. The communication apparatus 102 may be any communication apparatus capable of performing multilink communication with other communication apparatuses. The communication apparatus 102 may also be an information processing apparatus, such as a wireless chip, capable of performing wireless communication conforming to the IEEE802.11be standard. While specific examples of the communication apparatus 103 include a camera, a tablet, a smart phone, a PC, a portable phone, and a video camera, the present invention is not limited thereto. The communication apparatus 103 may be any communication apparatus capable of performing multilink communication with other communication apparatuses. The communication apparatus 103 may also be an information processing apparatus, such as a wireless chip, capable of performing wireless communication conforming to the IEEE802.11be standard. The network in FIG. 1 includes one AP and one STA, the number of APs and the number of STAs are not limited thereto.

For example, in a case where one AP maintains three different wireless communication links, the partner STAs may be one to three STAs. Likewise, in a case where one STA maintains three different wireless communication links, the partner APs may be one to three APs. Examples of applicable configurations include a configuration where an STA and an AP communicate with each other on a one-to-one basis, and a configuration where two STAs communicate with one AP on a multilink basis. The information processing apparatus, such as a wireless chip, has an antenna for transmitting a generated signal.

Figure 2:
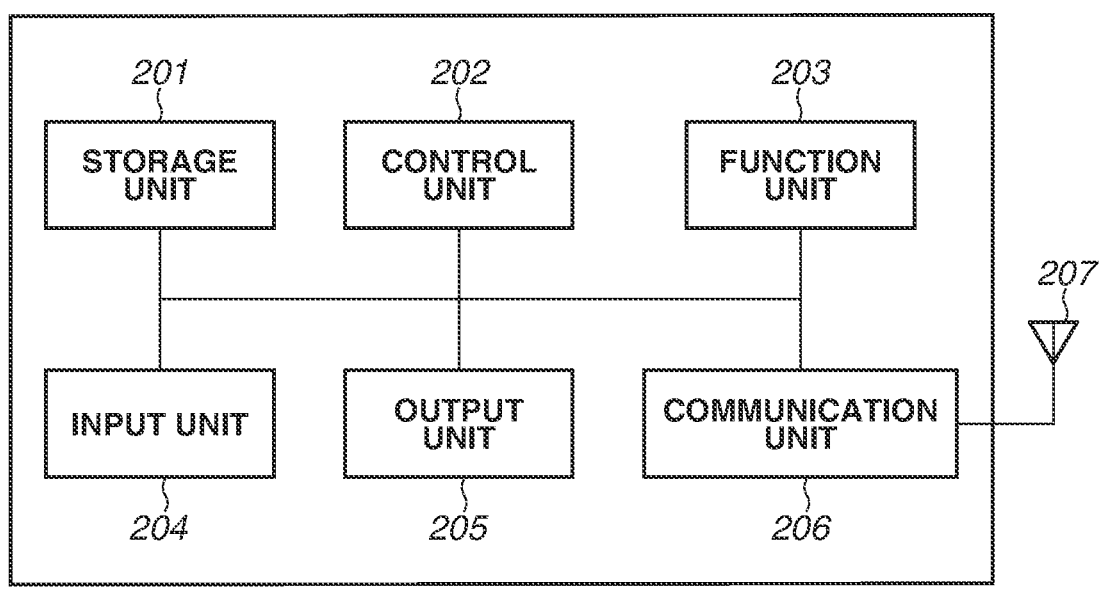
FIG. 2 is a diagram illustrating a hardware configuration of the communication apparatus 102 and a communication apparatus 103.

FIG. 2 illustrates a hardware configuration of the communication apparatuses 102 and 103 according to the present exemplary embodiment. The communication apparatus 102 includes a storage unit 201, a control unit 202, a function unit 203, an input unit 204, an output unit 205, a communication unit 206, and an antenna 207.

The storage unit 201 includes at least one memory, such as a Read Only Memory (ROM) and a Random Access Memory (RAM), and stores computer programs for implementing various operations (described below) and various information, such as communication parameters for wireless communication. ROM is an abbreviation for Read Only Memory, and RAM is an abbreviation for Random Access Memory. Storage media usable as the storage unit 201 include not only the ROM and the RAM but also a storage medium, such as a flexible disk, a hard disk, an optical disc, a magneto-optical disk, a compact disc read only memory (CD-ROM), a compact disc recordable (CD-R), a magnetic tape, a nonvolatile memory card, and a digital versatile disc (DVD). The storage unit 201 may also include a plurality of memories.

The control unit 202 includes, for example, at least one processor, such as a Central Processing Unit (CPU) and a Micro Processing Unit (MPU), and executes computer programs stored in the storage unit 201 to control the entire communication apparatus 102. The control unit 202 may control the entire communication apparatus 102 by a collaboration of computer programs and an Operating System (OS) stored in the storage unit 201. The control unit 202 generates data and signals (wireless frames) to be transmitted in communication with other communication apparatuses. CPU is an abbreviation for Central Processing Unit, and MPU is an abbreviation for Micro Processing Unit. The control unit 202 may also include a plurality of processors, such as a multi-core, and control the entire communication apparatus 102 by using the plurality of processors.

The control unit 202 also controls the function unit 203 to execute wireless communication, image capturing, printing, projection, and other predetermined processing. The function unit 203 is a hardware component for enabling the communication apparatus 102 to perform predetermined processing.

The input unit 204 receives various operations from the user. The output unit 205 performs various output operations to the user via a monitor screen and a speaker. The output operations by the output unit 205 include display on the monitor screen and sound output from the speaker. The input unit 204 and the output unit 205 may be implemented as one module like a touch panel. Each of the input unit 204 and the output unit 205 may be integrated with the communication apparatus 102 or separated therefrom.

The communication unit 206 controls wireless communication conforming to the IEEE802.11be standard. The communication unit 206 may control wireless communication conforming not only to the IEEE802.11be standard but also to other IEEE802.11 series standards and control wire-lined communication using, for example, a wire-lined LAN. The communication unit 206 controls the antenna 207 to transmit and receive wireless communication signals generated by the control unit 202. In a case where the communication apparatus 102 conforms to not only the IEEE802.11be standard but also the Near Field Communication (NFC) or the Bluetooth® standard, the communication unit 206 may control wireless communication conforming to these communication standards. NFC is an abbreviation for Near Field Communication. In a case where the communication apparatus 102 can perform wireless communication conforming to a plurality of communication standards, the communication apparatus 102 may include communication units and antennas individually conforming to the respective communication standards. The communication apparatus 102 communicates image data, document data, video data, and other data with the communication apparatus 103 via the communication unit 206. The antenna 207 may be configured separately from the communication unit 206 or configured integrally with the communication unit 206.

The antenna 207 supports communication in the 2.4 GHz, 5 GHz, and 6 GHz bands. While, in the present exemplary embodiment, the communication apparatus 102 is provided with one antenna, the communication apparatus 102 may have different antennas for respective frequency bands. In a case where the communication apparatus 102 has a plurality of antennas, the communication apparatus 102 may include the communication unit 206 for supporting each of the antennas.

Figure 3:
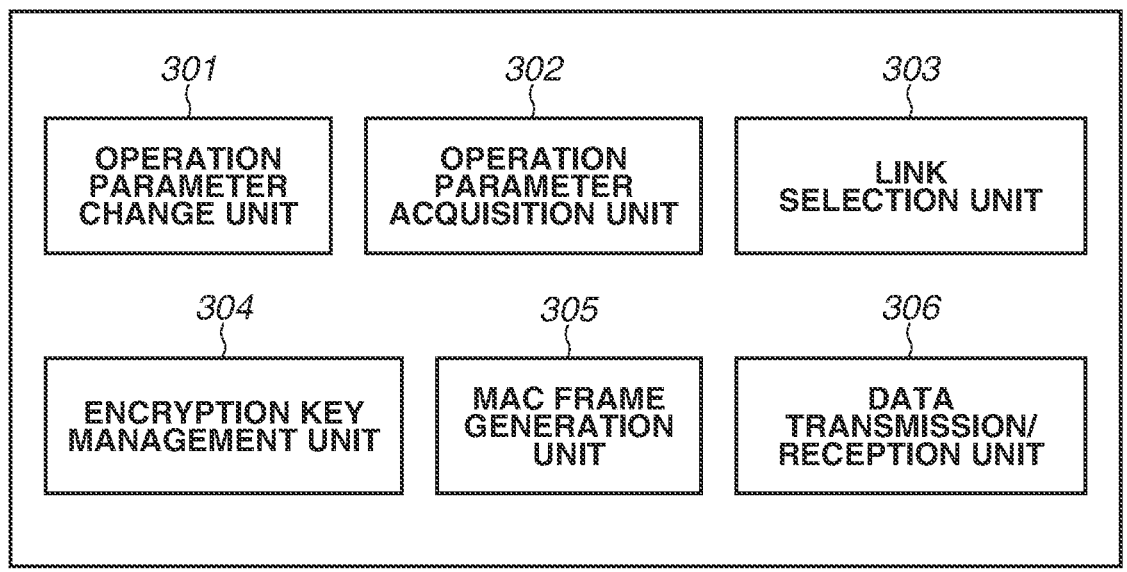
FIG. 3 is a diagram illustrating a functional configuration of the communication apparatuses 102 and 103.

FIG. 3 illustrates a functional configuration of the communication apparatuses 102 and 103 according to the present exemplary embodiment. Each of the communication apparatuses 102 and 103 includes an operation parameter change unit 301, an operation parameter acquisition unit 302, a link selection unit 303, an encryption key management unit 304, a Media Access Control (MAC) frame generation unit 305, and a data transmission/reception unit 306.

The operation parameter change unit 301 is a block for managing changes of the operation parameters for each link configuring multilinks of the communication apparatuses 102 and 103. The operation parameters may be possibly dynamically changed after a link is established. For example, there can be a case where the operation parameter of the communication bandwidth is changed (restricted) because of the congestion of neighboring channels. There are two different cases of changing the operation parameters. In one case, an own apparatus determines to change the operation parameters. In the other case, the own-apparatus changes the operation parameters based on a notification from the partner apparatus. In a case where the notification is received from the partner apparatus, the own apparatus changes the operation parameters by using an operation parameter acquired by the operation parameter acquisition unit 302.

The operation parameter acquisition unit 302 is a block for acquiring the operation parameter included in a MAC frame received from the partner apparatus. The operation parameter can be included in the header of the MAC frame.

The link selection unit 303 is a block for determining which of the plurality of links is to be used to notify the partner apparatus of the change of the operation parameters.

The encryption key management unit 304 is a block for managing encryption keys for each link. The encryption key management unit 304 performs encryption key exchange processing for each link. For example, the encryption key management unit 304 performs the 4 Way Handshake and the Group Key Handshake processing conforming to the IEEE802.11 standard and manages various types of encryption keys, such as a Pairwise Master Key (PMK), a Pairwise Transient Key (PTK), a Group Master Key (GMK), and a Group Transient Key (GTK). PMK is an abbreviation for Pairwise Master Key, PTK is an abbreviation for Pairwise Transient Key, GMK is an abbreviation for Group Master Key, and GTK is an abbreviation for Group Transient Key.

Figure 5:
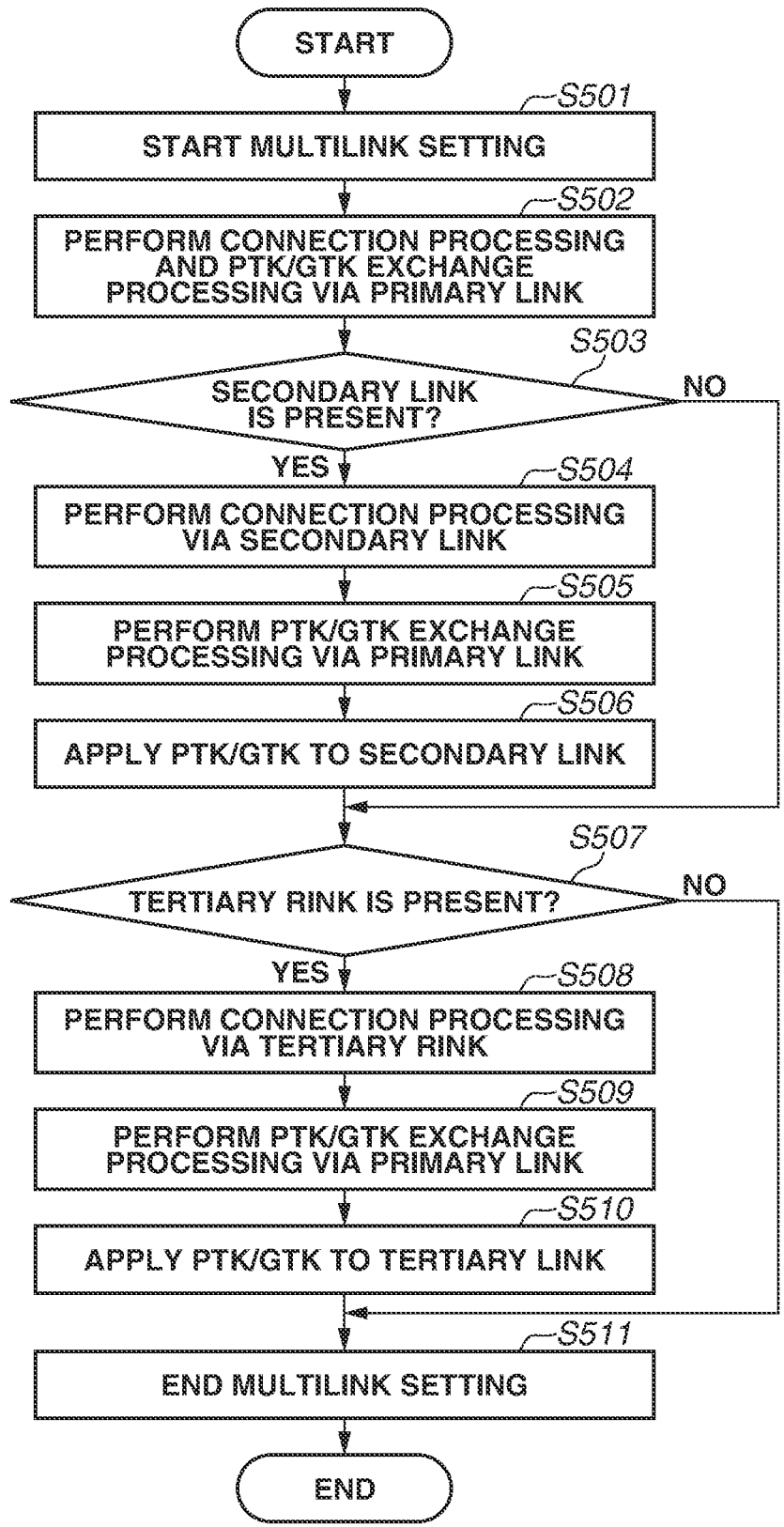
FIG. 5 is a flowchart illustrating processing performed by the communication apparatus 102 according to the present exemplary embodiment.

The MAC frame generation unit 305 is a block for generating a MAC frame including the operation parameters generated by the operation parameter change unit 301. Examples of MAC frames generated by the MAC frame generation unit 305 include various management frames, such as a Beacon frame and a Probe Response frame, and data frames. The operation parameters included in a MAC frame generated by the MAC frame generation unit 305 (described below) are illustrated in FIG. 5.

The data transmission/reception unit 306 transmits a wireless frame including the MAC frame generated by the MAC frame generation unit 305 and receives a wireless frame from the partner apparatus.

First Exemplary Embodiment

Figure 4:
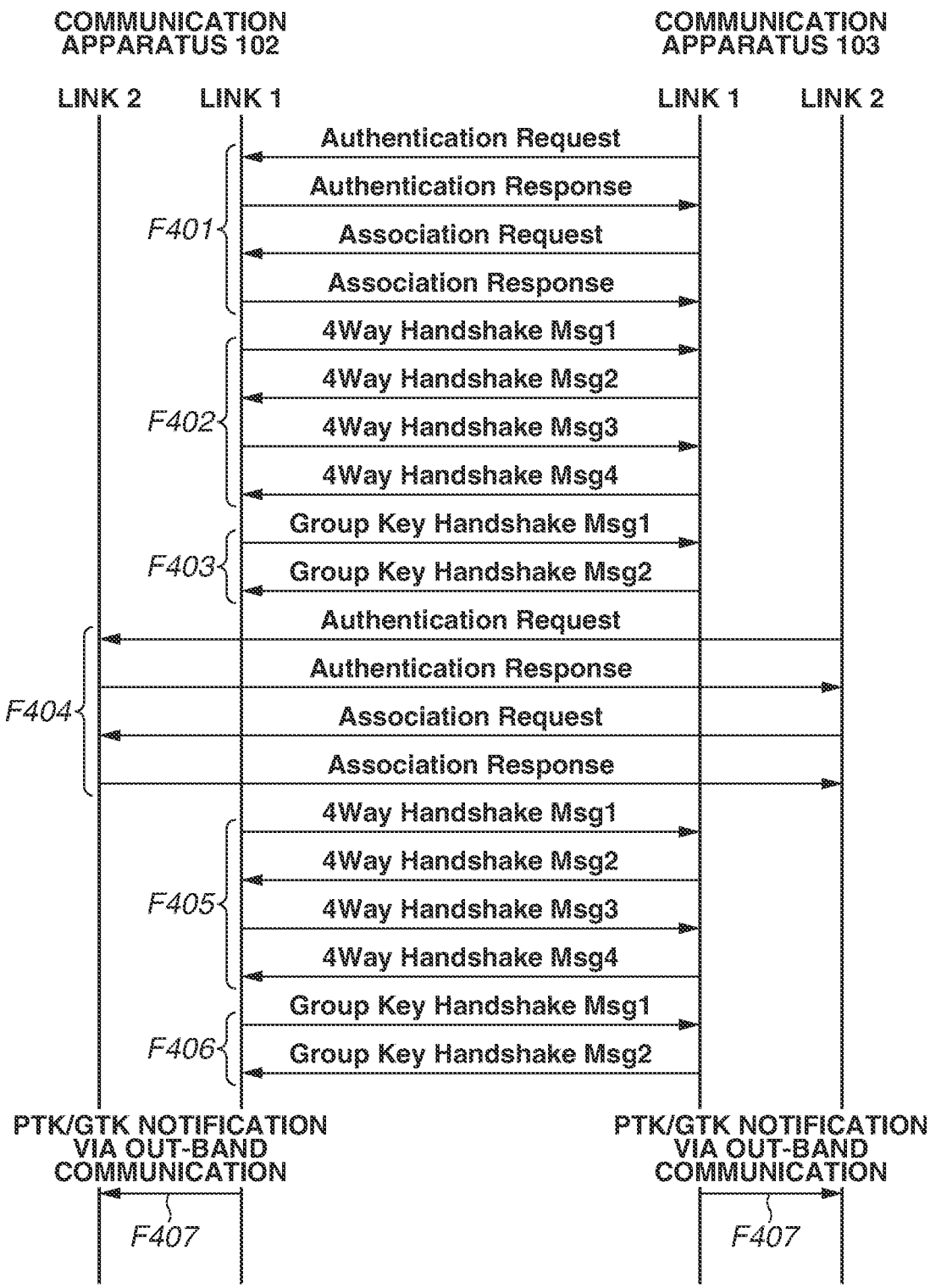
FIG. 4 is a sequence diagram illustrating a method in which the communication apparatus 102 exchanges encryption keys when the number of frequency channels of established connections changes.

FIG. 4 is a sequence diagram illustrating processing for exchange of encryption keys for use in encryption of a frequency channel of a connection newly established when the communication apparatuses 102 and 103 perform communication via a plurality of frequency channels.

The present exemplary embodiment will be described below centering on an example where two different links are used. In a link 1 (primary link), the communication apparatuses 102 and 103 perform communication processing via the first frequency channel (e.g., channel 1 in the 2.4 GHz band). In a link 2 (secondary link), the communication apparatuses 102 and 103 perform communication processing via the second frequency channel (e.g., channel 36 in the 5 GHz band). Referring to FIG. 4, although a third frequency channel is not illustrated, the communication apparatuses 102 and 103 can increase the number of links and perform communication, for example, by using the 6 GHz band as a link 3 (tertiary link).

In the present exemplary embodiment, 4 Way Handshake and Group Key Handshake are performed again via the first frequency channel of the connection already established when the number of frequency channels of established connections changes. In the following example, the PTK and GTK generated in the first frequency channel are shared for the second frequency channel between the communication apparatuses by using out-band communication.

Processing in this sequence is started when power of the communication apparatuses 102 and 103 is turned ON.

Alternatively, at least either one of the communication apparatuses 102 and 103 may start the sequence upon issuance of an instruction for starting multilink communication from the user or an application. Alternatively, at least either one of the communication apparatuses 102 and 103 may start the sequence when the amount of data to be communicated with the partner apparatus becomes a predetermined threshold value or larger.

Firstly, the communication apparatuses 102 and 103 establish the link 1 in the processing in step F401 via the first frequency channel. More specifically, the communication apparatus 103 transmits an Authentication Request frame to perform authentication, and then the communication apparatus 102 transmits an Authentication Response frame as a response to the request. Then, the communication apparatus 103 transmits an Association Request frame to establish a connection, and then the communication apparatus 102 transmits an Association Response frame as a response to the request.

Then, to share the PTK as a unicast key in the processing in step F402 via the first frequency channel, the communication apparatuses 102 and 103 perform the 4 Way Handshake processing as the key sharing processing defined by the IEEE802.11 standard.

Firstly, a PMK to be used for encryption in communication between the communication apparatuses 102 and 103 is generated and then notified from an authentication server to the communication apparatus 102. The PMK is used for generating a PTK in 4 Way Handshake. Then, the communication apparatus 102 exchanges random numbers called Anonce and Snonce in 4 Way Handshake Messages 1 and 2 with the communication apparatus 103, and generates a PTK based on the PMK and these random numbers. The PTK includes three different keys: a Key Encryption Key (KEK), a Key Confirmation Key (KCK), and a Temporary Key (TK). The TK is used for encryption in unicast communication, and the KCK is used for encryption of broadcast or multicast communication.

When performing communication based on the Wi-Fi Protected Access (WPA) authentication method or the Wi-Fi Protected Access-Pre-Shared Key (WPA-PSK) authentication method, the communication apparatus 102 transmits the PTK in 4 Way Handshake Message 3 in step F402 to share the PTK with the communication apparatus 103. However, when performing communication with the WPA2 authentication method, the communication apparatus 102 can transmit a GTK generated by the communication apparatus 102 in addition to the PTK.

Then, to share the GTK in the processing in step F403 via the first frequency channel, the communication apparatuses 102 and 103 perform the Group Key Handshake processing as the key sharing processing defined in the IEEE802.11 standard. When operation is performed based on the WPA2 authentication method, the GTK sharing processing can also be performed in 4 Way Handshake. In this case, therefore, step F403 is not performed.

Then, the communication apparatuses 102 and 103 establish the link 2 in the processing in step F404 via the second frequency channel. Specific processing in step F404 is similar to the processing in step F401.

In the processing in step F405, to generate a PTK to be used in communication via the second frequency channel, the communication apparatuses 102 and 103 perform 4 Way Handshake as the key sharing processing defined by the IEEE802.11 standard via the first frequency channel. Specific processing in step F405 is similar to the processing in step F402.

Then, to share the GTK as a group key in the processing in step F403 via the first frequency channel, the communication apparatuses 102 and 103 perform Group Key Handshake as the key sharing processing defined by the IEEE802.11 standard. Specific processing in step F406 is similar to the processing in step F403.

Then, in step F407, each communication apparatus shares the PTK and the GTK by using out-band communication different from the wireless LAN link. The out-band communication refers to communication other than wireless communication. For example, the PTK and the GTK generated in the first frequency channel by the communication apparatuses 102 and 103 can be notified by using, for example, a wireline in each communication apparatus to the second frequency channel. The encryption keys are managed by the encryption key management unit 304. In a case where the communication apparatus 102 forms a wire-lined connection with a plurality of communication apparatuses to form a Multi Link Device (MLD), these communication apparatuses share the PTK by using wirelines between the communication apparatuses. According to the present exemplary embodiment, the PTK and GTK are shared between the communication apparatuses by using wire-lined communication, not wireless communication. This method enables sharing the encryption keys with ensured security in comparison with a case of sharing the PTK and GTK by using wireless communication.

FIG. 5 illustrates a procedure of encryption key exchange processing that is performed when the number of frequency channels of established connections changes in multilink communication. This processing is implemented when the control unit 202 executes a program stored in the storage unit 201 of the communication apparatus 102.

Processing of this flowchart is started when power of the communication apparatus is turned ON. Alternatively, the communication apparatus may start the processing upon issuance of an instruction for starting multilink communication from the user or an application. Alternatively, the communication apparatus may start the processing when the amount of data to be communicated with the partner apparatus becomes a predetermined threshold value or larger. In step S501, the communication apparatus starts multilink setting processing at the above-described timings.

In step S502, the connection processing and the key exchange processing in steps F401 to F403 are performed via the first link (primary link).

Then, in step S503, determination of whether the second link (secondary link) is present is performed. In step S503, the determination of whether the secondary link is present is performed, based on determination of whether the communication apparatus 102 has received an Association Request frame in step F404. In a case where an Association Request frame has been received in a state where a connection has been established with the communication apparatus 102 via the first link (YES in step S503), then in step S504, the communication apparatus 102 performs the connection processing via the second link (secondary link). After the secondary link is established in step S504, then in step S505, the communication apparatus 102 subjects the PTK and the GTK to be used in the secondary link to the key exchange processing via the primary link. In step S506, the communication apparatus 102 shares the PTK and the GTK generated in the primary link in step S505, via the secondary link by using out-band communication. The key sharing method using out-band communication is as described above. After sharing the PTK and the GTK via the secondary link in step S506, then in step S507, determination of whether the third link (tertiary link) is present is performed. In a case where the communication apparatus 102 does not receive an Association Request frame (NO in step S503), the processing also proceeds to step S507. Processing in steps S508 to S510 is similar to the processing in steps S504 to S506, respectively, as the connection processing via the secondary link according to the present exemplary embodiment.

After completion of the GTK exchange processing via the tertiary link, then in step S511, the multilink setting processing ends.

According to the present exemplary embodiment, in a case where the communication apparatus 102 performs the communication via a plurality of frequency channels, the communication apparatus 102 can exchange the encryption keys even when the number of frequency channels of established connections changes. Further, sharing the encryption keys by using out-band communication enables exchanging of the encryption keys with ensured security in comparison with a case of sharing encryption keys via wireless communication.

Second Exemplary Embodiment

Figure 6:
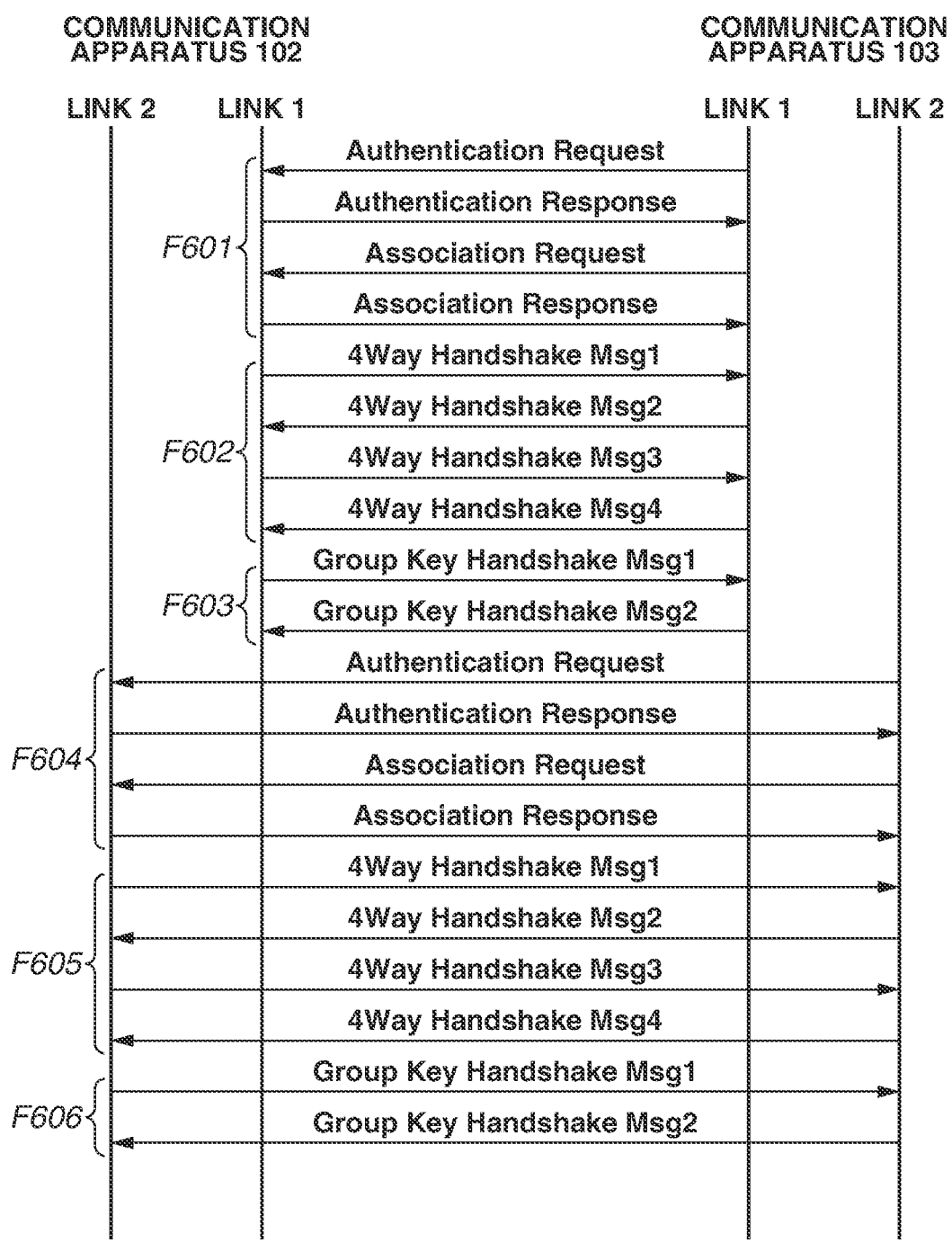
FIG. 6 is a sequence diagram illustrating a method in which the communication apparatus 102 exchanges encryption keys when the number of frequency channels of established connections changes.

FIG. 6 is a sequence diagram illustrating processing for exchange of encryption keys for use in encryption of the frequency channel of a connection newly established when the communication apparatuses 102 and 103 perform communication via a plurality of frequency channels.

The present exemplary embodiment will be described below centering on an example where two different links are used. In the link 1 as a primary link, communication processing via (e.g., channel 1 in the 2.4 GHz band) is performed, and in the link 2 as a secondary link (e.g., channel 36 in the 5 GHz band), communication processing via is performed. Referring to FIG. 6, although the third frequency channel is not illustrated, the number of links can be increased using, for example, the 6 GHz band, as the link 3 (tertiary link).

According to the present exemplary embodiment, each time when the number of frequency channels of established connections changes, the communication apparatus 102 performs 4 Way Handshake and Group Key Handshake to share the PTK and GTK between the communication apparatuses 102 and 103.

Processing in this sequence is started when power of the communication apparatuses 102 and 103 is turned ON. Alternatively, at least either one of the communication apparatuses 102 and 103 may start the sequence upon issuance of an instruction for starting multilink communication from the user or an application. Alternatively, at least either one of the communication apparatuses 102 and 103 may start the sequence when the amount of data to be communicated with the partner apparatus becomes a predetermined threshold value or larger.

Firstly, the communication apparatuses 102 and 103 establish the link 1 in the processing in step F601 via the first frequency channel. More specifically, the communication apparatus 103 transmits an Authentication Request frame to perform authentication, and then the communication apparatus 102 transmits an Authentication Response frame as a response to the request. Then, the communication apparatus 103 transmits an Association Request frame to establish a connection, and then the communication apparatus 102 transmits an Association Response frame as a response to the request.

Then, to share a PTK in the processing in step F602 via the first frequency channel, the communication apparatuses 102 and 103 perform the 4 Way Handshake processing defined in the IEEE802.11 standards. Specific processing in step F602 is similar to the processing in step F402.

Then, to share a GTK as a group key in the processing in step F603 via the first frequency channel, the communication apparatuses 102 and 103 perform the Group Key Handshake processing defined by the IEEE802.11 standard. Specific processing in step F603 is similar to the processing in step F403.

Then, the communication apparatuses 102 and 103 establish the link 2 in the processing in step F604 via the second frequency channel. Specific processing in step F604 is similar to the processing in step F601.

Then, to share the PTK in the processing in step F802 via the first frequency channel, the communication apparatuses 102 and 103 perform the 4 Way Handshake processing defined by the IEEE802.11 standard. Specific processing in step F606 is similar to the processing in step F402.

Figure 7:
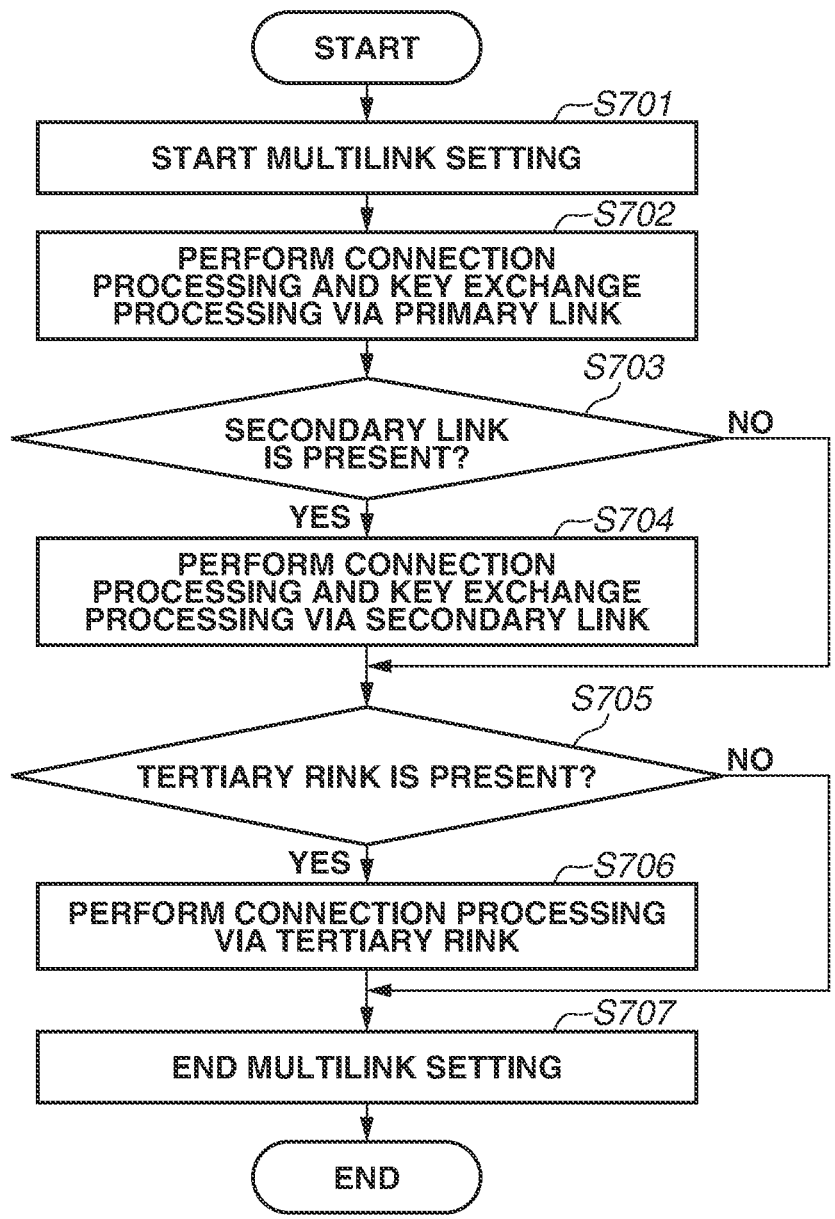
FIG. 7 is a flowchart illustrating processing performed by the communication apparatus 102 according to the present exemplary embodiment.

FIG. 7 illustrates a procedure of encryption key exchange processing that is performed when the number of frequency channels of established connections changes in multilink communication. This processing is implemented when the control unit 202 executes a program stored in the storage unit 201 of the communication apparatus 102.

Processing of this flowchart is started when power of the communication apparatus is turned ON. Alternatively, the communication apparatus may start the processing upon issuance of an instruction for starting multilink communication from the user or an application. Alternatively, the communication apparatus may start the processing when the amount of data to be communicated with the partner apparatus becomes a predetermined threshold value or larger. In step S701, the communication apparatus 102 starts multilink setting processing at the above-described timings.

In step S702, the communication apparatus 102 performs the connection processing and the key exchange processing in steps F601 to F603 via the first link (primary link).

Then, in step S703, the communication apparatus 102 determines whether the second link (secondary link) is present. In step S703, the communication apparatus 102 determines whether the secondary link is present, based on determination of whether the communication apparatus 102 has received an Association Request frame in step F604. In a case where an Association Request frame has been received in a state where a connection has been established with the communication apparatus 102 via the first link (YES in step S703), then in step S704, the communication apparatus 102 performs the connection processing and the key exchange processing via the second link (secondary link). After sharing the PTK and the GTK via the secondary link in step S704, then in step S705, the communication apparatus 102 determines whether the third link (tertiary link) is present. In a case where the communication apparatus 102 does not receive an Association Request frame (NO in step S703), then in step S705, the communication apparatus 102 determines whether the tertiary link is present. Processing in step S705 and subsequent steps is similar to the secondary link connection processing.

After the GTK exchange processing is performed via the tertiary link in step S706, then in step S707, the multilink setting processing ends.

According to the present exemplary embodiment, in a case where the communication apparatus 102 performs communication based on the WPA authentication method via a plurality of frequency channels, exchanging of the encryption keys can be performed by the key sharing processing each time when the number of frequency channels of established connections with the communication apparatus 102 changes.

Third Exemplary Embodiment

Figure 8:
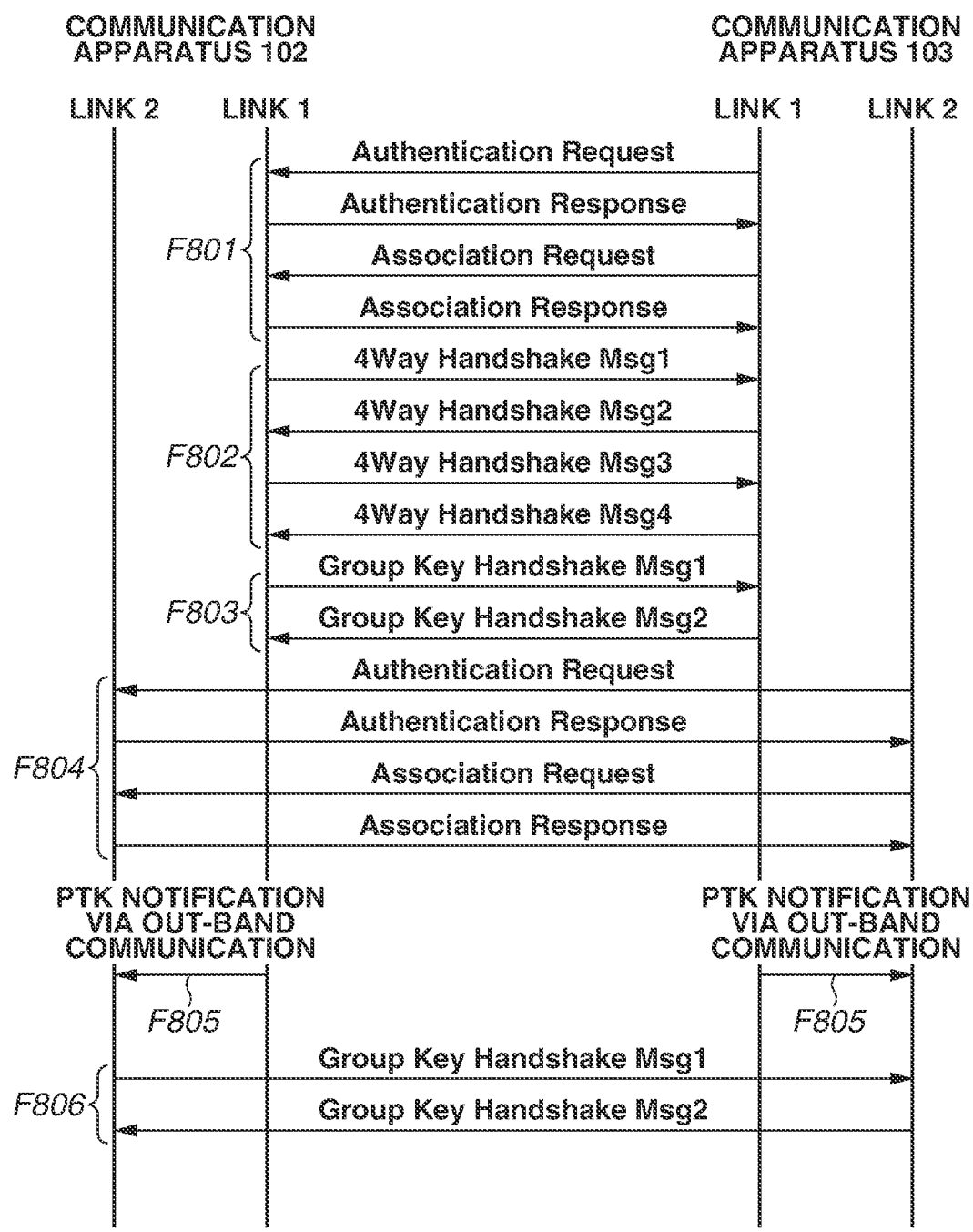
FIG. 8 is a sequence diagram illustrating a method in which the communication apparatus 102 exchanges encryption keys when the number of frequency channels of established connections changes.

FIG. 8 is a sequence diagram illustrating processing for exchange of encryption keys for use in encryption of the frequency channel of a connection newly established when the communication apparatuses 102 and 103 perform communication via a plurality of frequency channels.

The present exemplary embodiment will be described below centering on an example where two different links are used. In the link 1 as a (primary link, communication processing via the first frequency channel (e.g., channel 1 in the 2.4 GHz band) is performed. In the link 2 as a secondary link, communication processing via the second frequency channel (e.g., channel 36 in the 5 GHz band) is performed. Although the third frequency channel is not illustrated in FIG. 8, the number of links can be increased using, for example, the 6 GHz band, as the link 3 (tertiary link).

According to the present exemplary embodiment, a PTK shared via the first frequency channel by the communication apparatuses 102 and 103 is shared for the second frequency channel by each communication apparatus by using out-band communication.

Processing in this sequence is started when power of the communication apparatuses 102 and 103 is turned ON. Alternatively, at least either one of the communication apparatuses 102 and 103 may start the sequence upon issuance of an instruction for starting multilink communication from the user or an application. Alternatively, at least either one of the communication apparatuses 102 and 103 may start the sequence when the amount of data to be communicated with the partner apparatus becomes a predetermined threshold value or larger.

Firstly, the communication apparatuses 102 and 103 establish the link 1 in the processing in step F801 via the first frequency channel. More specifically, the communication apparatus 103 transmits an Authentication Request frame to perform authentication, and then the communication apparatus 102 transmits an Authentication Response frame as a response to the request. Then, the communication apparatus 103 transmits an Association Request frame to establish a connection, and then the communication apparatus 102 transmits an Association Response frame as a response to the request.

Then, to share a PTK in the processing in step F802 via the first frequency channel, the communication apparatuses 102 and 103 perform the 4 Way Handshake processing defined by the IEEE802.11 standard. Specific processing in step F802 is similar to the processing in step F402.

Then, in step F803, to share a GTK in the processing in step F803 via the first frequency channel, the communication apparatuses 102 and 103 perform Group Key Handshake processing defined by the IEEE802.11 standard. Specific processing in step F803 is similar to the processing in step F403.

Then, the communication apparatuses 102 and 103 establish the link 2 in the processing in step F804 via the second frequency channel. Specific processing in step F804 is similar to the processing in step F801.

Then, in step F805, each communication apparatus shares the PTK by using out-band communication in a frequency channel different from the frequency channel used in the generation of the PTK. The key sharing method using out-band communication is as described above.

Then, to share a GTK in the processing in step F806 via the second frequency channel, the communication apparatuses 102 and 103 perform the Group Key Handshake processing defined by the IEEE802.11 standard. In a case where the processing in step F806 is performed via the first frequency channel, the Group Key Handshake processing is performed via the first frequency channel, and the shared GTK is shared for the second frequency channel by using out-band communication. The key sharing method using out-band communication is as described above.

FIG. 9 illustrates a procedure of processing for exchange of encryption keys when the number of frequency channels of established connections changes in multilink communication. This processing is implemented when the control unit 202 executes a program stored in the storage unit 201 of the communication apparatus 102.

In step S902, the connection processing and the key exchange processing illustrated in steps F801 to F803 is performed via the first link (primary link).

Then, in step S903, determination of whether the second link (secondary link) is present is performed. In step S903, the determination of whether the secondary link is present is performed, based on determination of whether the communication apparatus 102 has received an Association Request frame in step F804. In a case where an Association Request frame has been received in a state where a connection has been established with the communication apparatus 102 via the first link (YES in step S903), then in step S904, the communication apparatus 102 performs the connection processing via the second link (secondary link). When the link of the secondary link is established in step S904, then in step S905, the communication apparatus 102 shares a PTK used in the primary link, by using out-band communication. The key sharing method using out-band communication is as described above. In a case where the communication apparatus 102 does not receive an Association Request frame (NO in step S903), then in step S907, the communication apparatus 102 determines whether the tertiary link is present.

In step S905, the communication apparatus 102 shares the PTK by using out-band communication, and in step S906, the communication apparatus 102 performs the GTK exchange processing via the secondary link.

Then, in step S907, the communication apparatus 102 determines whether the third link (tertiary link) is present. Processing in steps S908 to 910 is similar to the processing in steps S904 to S906, respectively, as the secondary link connection processing.

After completion of the GTK exchange processing via the tertiary link, then in step S911, the multilink setting processing ends.

According to the present exemplary embodiment, in a case where the communication apparatus 102 performs communication via a plurality of frequency channels, the communication apparatus 102 can exchange the encryption keys even when the number of frequency channels of established connections with the communication apparatus 102 changes. Further, sharing the encryption keys by using out-band communication enables exchanging of the encryption keys with ensured security in comparison with a case of sharing encryption keys via wireless communication.

Although, in the present exemplary embodiment, the GTK is used as an example of a group key, the present invention is not limited thereto. As defined by the IEEE802.11 standard, the communication apparatuses 102 and 103 share not only the GTK but also an Integrity Group Transient Key (IGTK) when a control frame (Management Frame) is also encrypted. IGTK is an abbreviation for Integrity Group Transient Key. Determination of whether only the GTK is to be shared or the GTK and also the IGTK are to be shared is performed in a negotiation between the communication apparatuses 102 and 103 in the exchange of an Association Request frame and an Association Response frame.

A recording medium storing the program code of software for implementing the above-described functions may be supplied to a system or an apparatus, and the computer (CPU or MPU) of the system or the apparatus may read and execute the program code stored in the recording medium. In this case, the program code itself read from the storage medium implements the functions of the above-described exemplary embodiments, and the storage medium storing the program code configures the above-described apparatus.

Examples of usable storage media to supply a program code include a flexible disk, a hard disk, an optical disc, a magneto-optical disk, a CD-ROM, a CD-R, a magnetic tape, a nonvolatile memory card, a ROM, and a DVD.

The above-described functions may be implemented not only when the computer executes the read program code but also when the Operating System (OS) operating on the computer executes part or whole of the actual processing based on instructions of the program code. OS is an abbreviation for Operating System.

Further, the program code read by the storage medium is written to a memory included in a function expansion board inserted into the computer or a function expansion unit connected to the computer. The CPU included in the function expansion board or the function expansion unit may implement the above-described functions by executing part or whole of the actual processing based on instructions of the program code.

The present invention can also be achieved when a program for implementing at least one of the functions of the above-described exemplary embodiments is supplied to a system or an apparatus via a network or a storage medium, and at least one processor in a computer of the system or the apparatus reads and executes the program. Further, the present invention can also be achieved by a circuit (for example, an application specific integrated circuit (ASIC)) for implementing at least one function.

The present invention is not limited to the above-described exemplary embodiments but can be modified and changed in diverse ways without departing from the spirit and scope thereof. Therefore, the following claims are appended to disclose the scope of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, encryption keys is able to be exchanged even in a case where the number of frequency channels of established connections changes in communication via a plurality of frequency channels.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A first communication apparatus performing communication conforming to the Institute of Electrical and Electronics Engineers (IEEE) 802.11be standard, the first communication apparatus comprising:
   at least one memory that stores a set of instructions; and
   at least one processing circuit;
   wherein the first communication apparatus is caused, by the at least one processing circuit executing the instructions and/or the at least one processing circuit itself operating, to perform operations comprising:
   performing a setting process for setting a plurality of links including at least a first link and a second link between the first communication apparatus and a second communication apparatus, wherein the first link uses a first frequency channel and the second link uses a second frequency channel different from the first frequency channel; and
   sharing a Pairwise Transient Key (PTK) for encrypting a unicast communication frame by performing a 4wayhandshake between the first communication apparatus and the second communication apparatus via the set first link after communicating an Association Request frame and an Association Response frame via the first frequency channel, wherein 4wayhandshake between the first communication apparatus and the second communication apparatus via the set second link is not performed, and
   wherein a unicast communication frame in the second link in which a same Service Set Identifier (SSID) as an SSID set in the first link is set is encrypted using the shared PTK.

2. The first communication apparatus according to claim 1, wherein the first communication apparatus further shares a key for encrypting a management frame in the 4wayhandshake.

3. A communication method for a first communication apparatus that performs communication conforming to the Institute of Electrical and Electronics Engineers (IEEE) 802.11be standard, the method comprising:
   performing a setting process for setting a plurality of links including at least a first link and a second link between the first communication apparatus and a second communication apparatus, wherein the first link uses a first frequency channel and the second link uses a second frequency channel different from the first frequency channel; and sharing a Pairwise Transient Key (PTK) for encrypting a unicast communication frame by performing a 4wayhandshake between the first communication apparatus and the second communication apparatus via the set first link after communicating an Association Request frame and an Association Response frame via the first frequency channel, wherein 4wayhandshake between the first communication apparatus and the second communication apparatus via the set second link is not performed, and wherein a unicast communication frame in the second link in which a same Service Set Identifier (SSID) as an SSID set in the first link is set is encrypted using the shared PTK.

4. A non-transitory computer-readable storage medium storing a program for causing a computer to execute a communication method for a first communication apparatus that performs communication conforming to the Institute of Electrical and Electronics Engineers (IEEE) 802.11be standard, the method comprising:

performing a setting process for setting a plurality of links including at least a first link and a second link between the first communication apparatus and a second communication apparatus, wherein the first link uses a first frequency channel and the second link uses a second frequency channel different from the first frequency channel; and sharing a Pairwise Transient Key (PTK) for encrypting a unicast communication frame by performing a 4wayhandshake between the first communication apparatus and the second communication apparatus via the set first link after communicating an Association Request frame and an Association Response frame via the first frequency channel, wherein 4wayhandshake between the first communication apparatus and the second communication apparatus via the set second link is not performed, and wherein a unicast communication frame in the second link in which a same Service Set Identifier (SSID) as an SSID set in the first link is set is encrypted using the shared PTK.

5. The first communication apparatus according to claim 1, wherein in the setting processing, a third link is set in addition to the first link and the second link is performed.

6. The first communication apparatus according to claim 1, wherein the operations further comprise:

storing the shared PTK in a predetermined storage area to manage the shared PTK as a PTK to be used for encrypting data for the unicast communication in the set second link.

7. The first communication apparatus according to claim 1, wherein the operations further comprise:

performing simultaneous multi-link transmission control in a manner such that, in a case where first data has been transmitted to the second communication apparatus via the set first link, second data is transmitted to the second communication apparatus via the set second link.

8. The first communication apparatus according to claim 7, wherein the first data contains content that is the same as content contained in the second data.

9. The first communication apparatus according to claim 7, wherein the first data contains content that is different from content contained in the second data.

10. The first communication apparatus according to claim 8, wherein each of the first data and the second data is data obtained by dividing third data.

11. The first communication apparatus according to claim 2, wherein the key for encrypting the management frame is an Integrity Group Transient Key (IGTK).

* * * * *